US006300570B1

(12) United States Patent
Lai

(10) Patent No.: US 6,300,570 B1
(45) Date of Patent: Oct. 9, 2001

(54) PORTABLE MULTI-OUTLET ASSEMBLY WITH A TURNABLE EAVE

(76) Inventor: Li-Chun Lai, 21F-1, No.33, Sec.1, Min-Sheng Rd., Panchiao City, Taipei Hsien (TW)

( * ) Notice: Subject to any disclaimer, the term of this patent is extended or adjusted under 35 U.S.C. 154(b) by 0 days.

(21) Appl. No.: 09/754,202

(22) Filed: Jan. 5, 2001

(51) Int. Cl.[7] .................................................. H02G 3/14

(52) U.S. Cl. ........................................ 174/67; 220/242

(58) Field of Search ......................... 174/67; 220/242, 220/3.8

(56) References Cited

U.S. PATENT DOCUMENTS

D. 395,726 * 6/1998 Pink et al. ............................ D26/68
4,102,466 * 7/1978 Jadatz .................................... 220/3.8
5,879,184 * 3/1999 Lopez .................................... 439/502

* cited by examiner

*Primary Examiner*—Dean A. Reichard
*Assistant Examiner*—Hung T Nguyen
(74) *Attorney, Agent, or Firm*—Bacon & Thomas PLLC

(57) ABSTRACT

A portable multi-outlet assembly with turnable eave. The assembly is equipped with an eave engaged to the face plate of the multi-outlet assembly with two set buttons set on respective eye holes provide at both sides of the ave so as to make the eave turnable in two semi-circular slots formed at both sides of the eave. Moreover, the movement of the eave is so arranged that it is turnable upward up to 180° until the button claw mate with the stoppers in two slots of the eave. At this time the operator is able to insert plugs into the outlets at a most ergonomically comfortable direction of 45° inclination. The multi-outlet assembly can be set on the ground by a bayonet-shaped post with the face plate of the assembly parallel to the ground such that the inserted plugs can also be shaded by the eave thereby preventing entry of rain water into the multi-outlet assembly.

10 Claims, 4 Drawing Sheets

PORTABLE MULTI-OUTLET ASSEMBLY WITH A TURNABLE EAVE

BACKGROUND OF THE INVENTION

1. Field of the Invention

The present invention relates to a portable multioutlet assembly, and in particular to a portable multioutlet assembly with turnable eave capable of preventing entry of rain water or wet foreign materials thereby ensuring electric security.

2. Description of the Prior Art

A portable multioutlet assembly attached with an extension cord is a welcome electrical power supply source owing to its conveniency. It is not only widely used indoor to compensate insufficiently equipped outlets in finished buildins where wiring installations are ready, but also applicable to supply power for outdoor lamps or appliances for tentative requirement. When being used outdoor, the portable multioutlet assembly is usually installed on the muddy ground, lawns, or along gravel pathways with a conical or bayonet shaped post inserted thereon so as to fix the portable multioutlet assembly on the ground. In this version, puddles on the ground will inevitably seep through the face plate of the outlets and sneak into inner part of the outlets thereby causing hazardous insulation breakdown.

Such a case is often experienced by people who use a conventional portable multioutlet assembly in the past time, and improvements should be done for the sake of assuring electric security.

In view of the foregoing situation, the inventor of the invention herein conducted intensive research based on many years of experience gained through professional engagement in the manufacturing of related products, with continuous experimentation and improvement culminating in the development of the present invention herein.

SUMMARY OF THE INVENTION

It is an object of the present invention to provide a portable multioutlet assembly with turnable eave wherein the face plate of the multioutlet is shaded by an eave, when the multioutlet assembly is set on the ground with a post, its face plate is parallel to the ground such that plugs which are inserted into the outlets can also be shaded by the eave thereby preventing entry of rain water into the multioutlet assembly to cause insulation breakdown.

It is another object of the present invention to provide a portable multioutlet assembly with turnable eave that the eave is tarnable upward by 180° thereby facilitating the operator to insert plugs into the outlets from 45° inclined angle that is ergonomically the most comfortable direction for working.

To achieve the above mentioned objects, the portable multioutlet assembly of the present invention has an eave engaged to the face plate of the multioutlet assembly with two set buttons set on respective eye holes provided at both sides of the eave so as to make the eave turnable in two semi-circular slots formed at both sides of the eave. Moreover, the movement of the eave is so arranged that it is turnable upward up to 180° until the button claws mate with stoppers installed in two slots of the eave. At this time the operator is able to insert plugs into the outlets from 45° inelined angle. Besides, the multioutlet assembly can be set on the ground by a bayonet shaped post with the face plate of the assembly parallel to the ground such that the inserted plugs can also be shaded by the eave thereby preventing entry of rain water into the multioutlet assembly.

The above and other objects, advantages and features of the present invention will become more readily appreciated and understood from a cansideration of the following detailed description of preferred embodiment of the invention when taken together with the following accompanying drawings.

DETAILED DESCRIPTION OF THE PREFERRED EMBODIMENT

Figure 1:
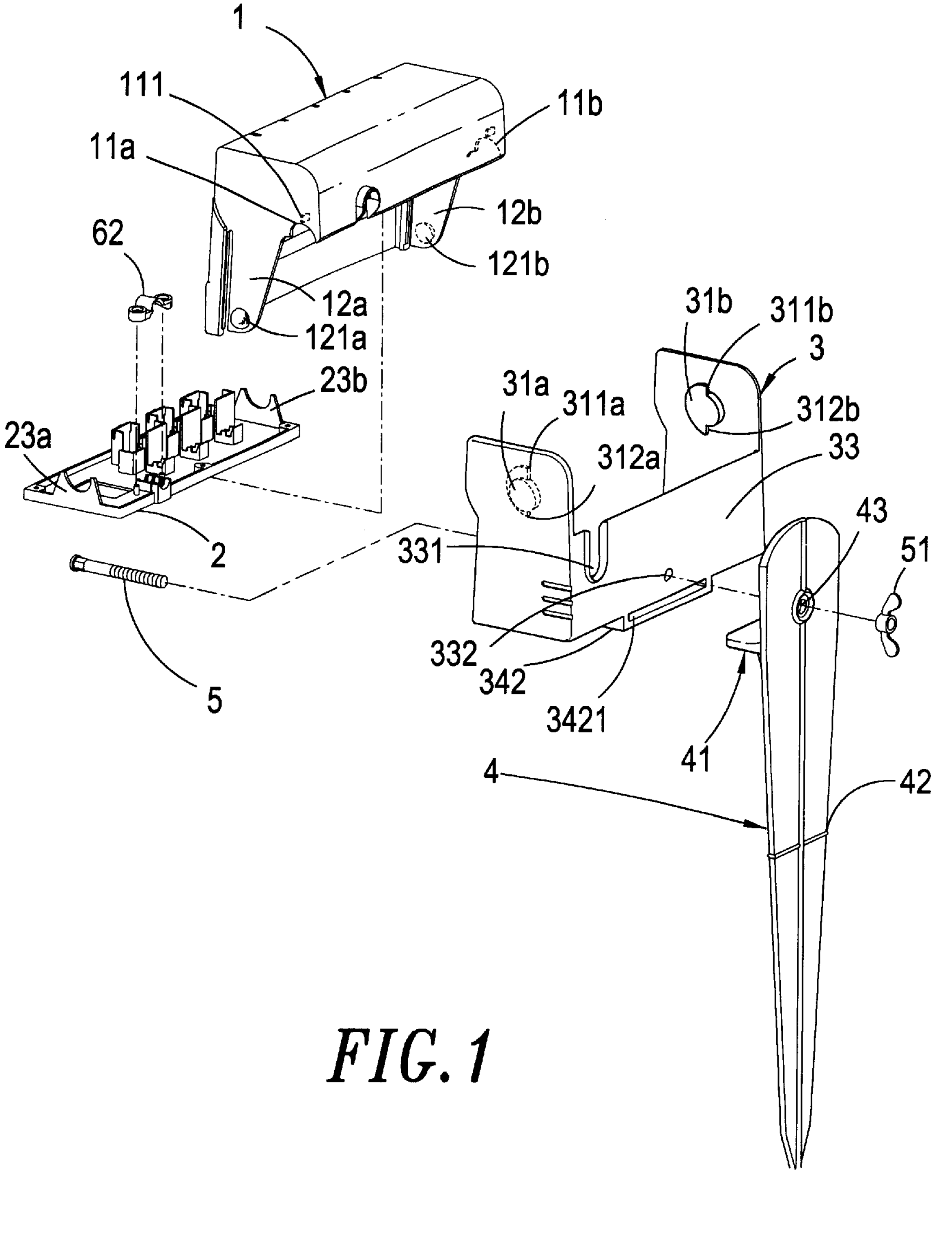
FIG. 1 is an exploded three dimensional view of the present invention.
Figure 2C:
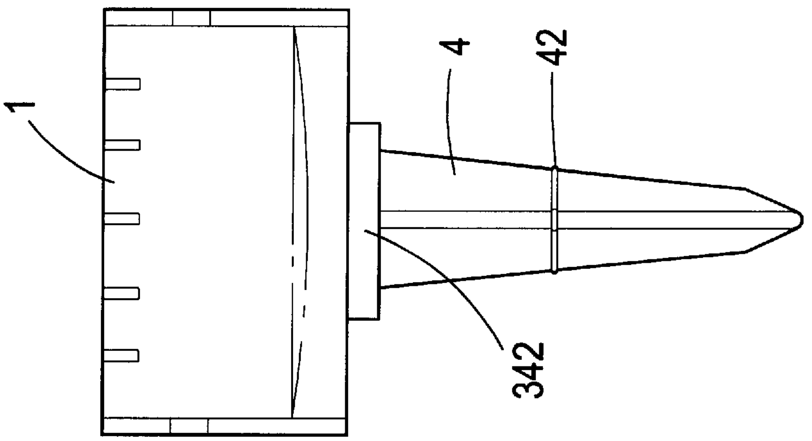
FIG. 2C is a front view of the present invention.
Figure 2B:
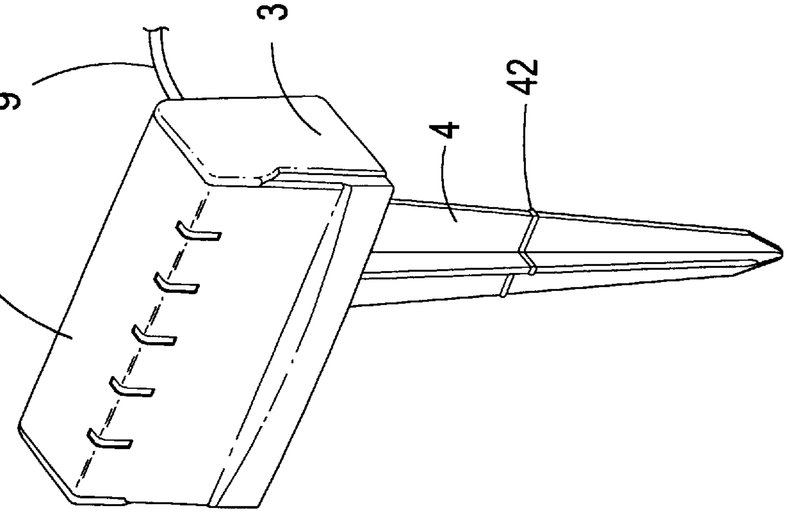
FIGS. 2A and 2B are three dimensional assembly views of the present invention showing when the eave is opened (FIG. 2A) and the eave is closed (FIG. 2B) respectively.
Figure 2A:
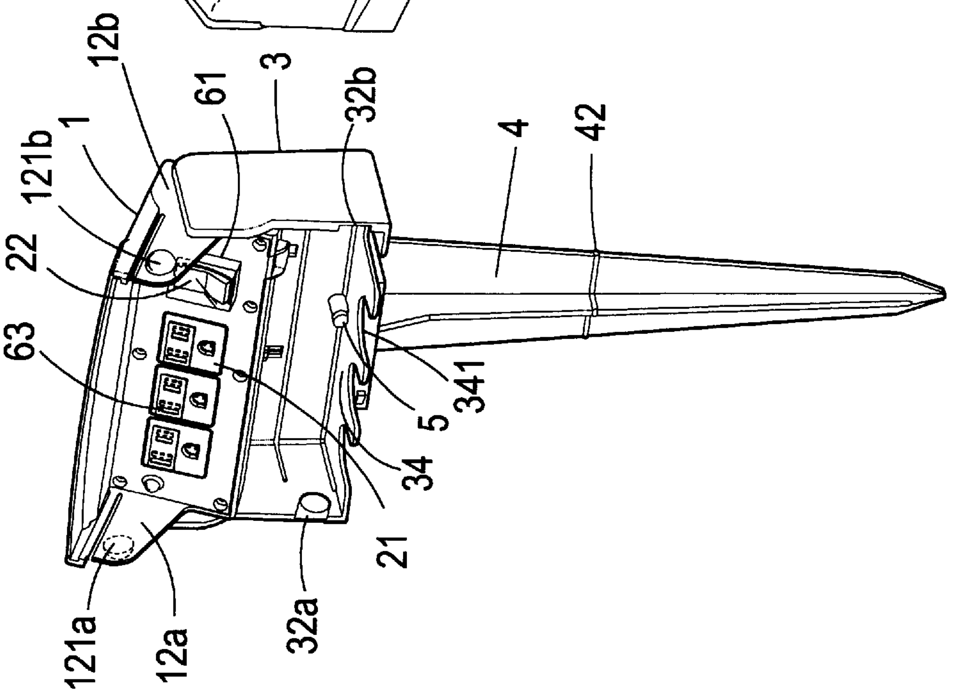

Referring to FIGS. 1 through 2A, 2B, 2C, the multioutlet assembly of the present invention essentially comprises:

An eave 1 installed in a relevant place on top side of the assembly with two movable semi-circular slotted plates of slots 11*a,* 11*b* each being provided with a stopper therein, two spring plates 12*a,* 12*b* are provided at two sides of the eave 1 having blocks 121 a and 121*b* respectively at their bottom edges;

A mounting base 3 with two set buttons 31*a,* 31*b* installed respectively at two sides of its top end, on the other hand two opening tenons 32*a,* 32*b* are formed near two edges of its bottom, furthermore, a guide slot 331 is formed at a rear wall 33 of the base 3 thereof for emerging power supply cord 9 connected to the assembly, near the bottom of the rear wall 3 there is bored a circular hole 332, and at the lower end portion 34 of the base 3 there are provided four openings 341 and a seat 342 for emerging the plup assembly 7 which is connected to outlets 21 and the supply cord9 emerging from the opening 341, and the seat 342 is formed with an insertion recess 3421 for accepting insertion of a bayonet shaped post4;

a face plate 2 having two semi-circular lugs 23*a* and 23*b* protruded upward respectively at two sides the outlets 21 and a source switch 22 are mounted on the face plate 2, a protecting cover 63 is provided for the outlets 21 so as to keep away ingress of foreign materials thereinto when not in use, also an insulation cover 61 is enclosed on the source switch 22 for preventing careless contact with live parts, a saddle 62 provided at the rear surface of the face plate 2 is for fastening the supply cord 9 at its position;

the bayonet shaped post 4 has a graduation 42 marked therean for identifying the depth of the post 4 in the ground surface, an insert 41 is provided at a proper position near the top portion of the post 4 for inserting into the recess 3421 so as to engage the mounting base 3 and the post 4, the engagement of the two components is further enhanced by a bolt 5 turnneling through both the circular hole 332 on the base 3 and a screw hole 43 on the post 4 and then screw combining both components with a nut 51.

With the above mentioned structure, placing the set buttons 31*a,* 31*b* in the slots 11*a,* 11*b* of the semi-circular slotted plates so as to make their respective button claws 311*a,* 311*b* able to mate with the stopper 111 formed in the slots 11*a,* 11*b* resulting in that the eave 1 is turnable upward, and combining the face plate 2 with the eave 1 such that the semi-circular lugs 23*a,* 23*b* at two sides of the face plate 2 and the semi-circular slots 11*a,* 11*b* are coupled together respectively to form round holes thereby enclosing the set buttons 31 *a,*31*b*. In this version, the eave 1 is turnable upwardly with respect to the set buttons 31 *a,*31*b* as a center of revolving axis. Before opening the eave 1 by turning it upward, the blocks 121*a,* 121*b* at the bottom ends of the spring plates 12*a,* 12*b* are clogged in the opening mortise 32*a,* 32*b* so as to form the multioutlet assembly of the present invention in closed state.

Figure 3C:
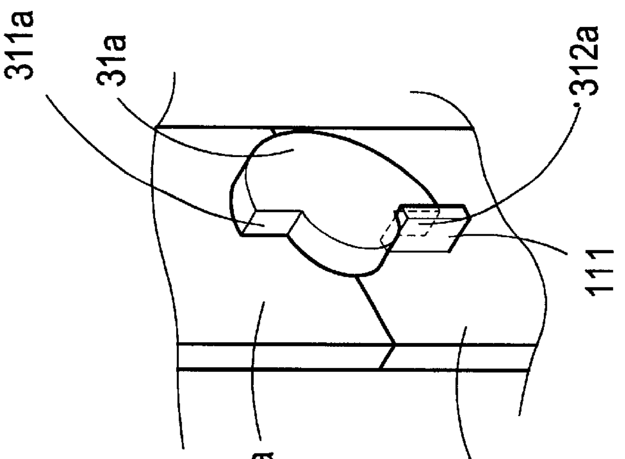
FIGS. 3A to 3C are the views illustrating relative movement between the eave and the face plate of the present invention.
Figure 3B:
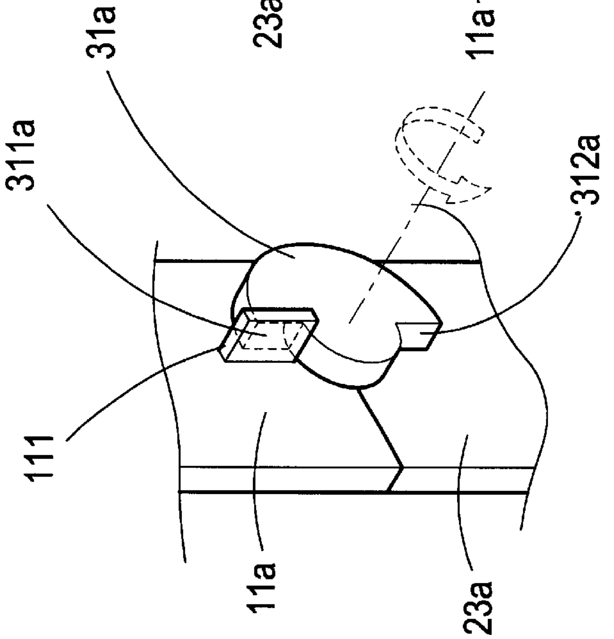
Figure 3A:
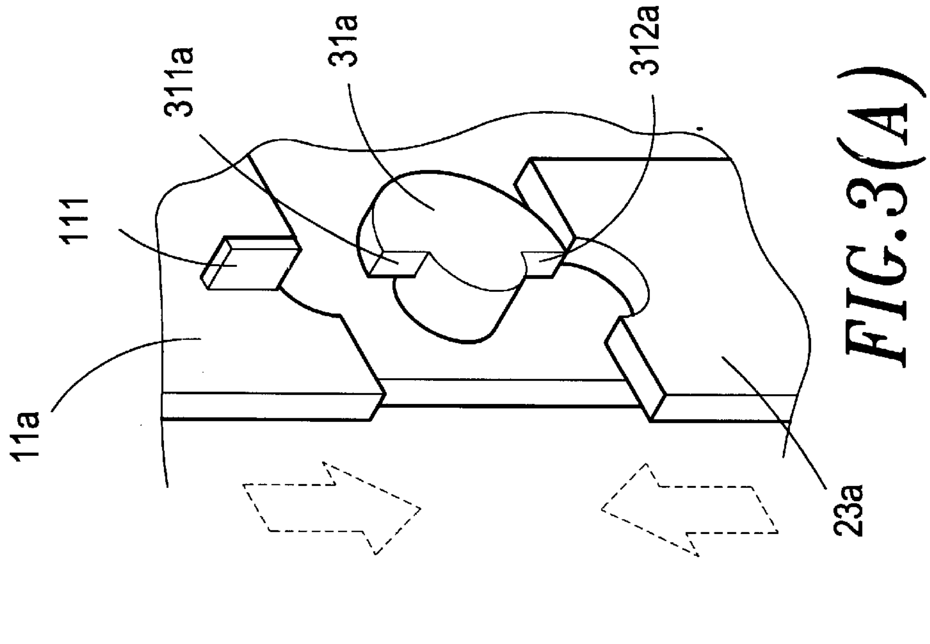

FIGS. 3A, 3B and 3C are the views illustrating relative movement between the eave and the face plate of the multioutlet assembly. When the set buttons 31*a,* 31*b* are enclosed in the round holes formed by lugs 23*a,* 23*b* of the face plate 2 and the slots 11*a,* 11*b* coupled together, the claw 311*a* of the set button 31 a mates the stopper 111 formed in the slot 11 a so that continuous downward motion of the eave 1 is obstructed. When the eave 1 is going to turn upward from this position, the stopper 111 is mated with the button claw 312*a* in the other end of the set button 31 a so that the eave 1 together with connected face plate 2 is turnable 180° upward.

Figure 4A:
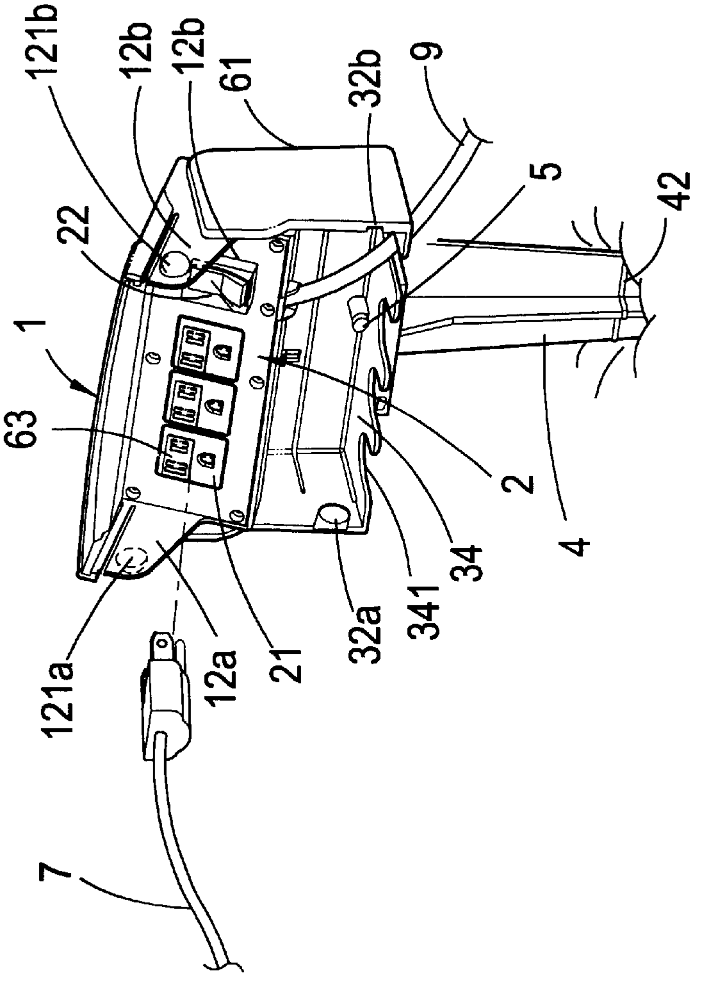
FIGS. 4A and 4B are the views showing practical installation in an embodiment of the present invention.
Figure 4B:
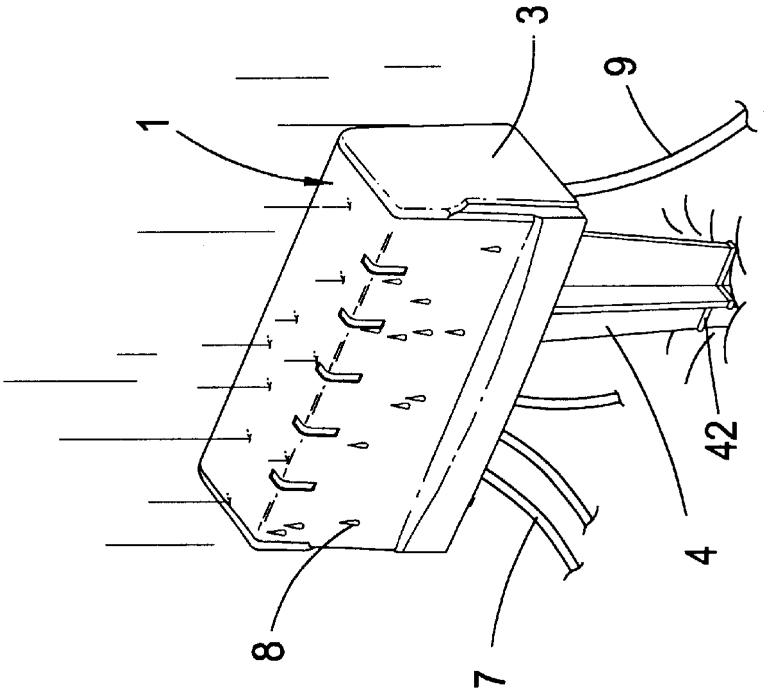

FIGS. 4A and 4B are views showing an embodiment of the present invention. The multioutlet assembly is set on outdoor muddy or sand ground, lawns or gravel pathway with the bayonet shaped post 4 to isolate the puddles on the ground and keep the face plate 2 parallel to the ground surface. When using it, the eave 1 is turned with a certain angle to expose the face plate 2 so that the plugs 7 can be inserted into the outlets 21 with an ergonomically optimum angle. After restoring the eave 1 in its closed state, the plugs 7 are also shaded by the eave 1 and perpendicular to the ground. Meanwhile, the plugs 7 are emerged out of the mounting base 3 through the openings 341 provided on the bottom surface 34 of the mounting base 3 thereby prohibiting rain water 8 into the face plate 2 and preventing hazardous insulation puncture.

It reveals from the description of the above example that the invention has several noteworthy advantages, in particular:

1. The face plate of the multioutlet assembly is shaded by the eave when the assembly is set on the ground with the post, its face plate is parallel to the ground such that plugs which are inserted into the outlets can also be shaded by the eave thereby preventing entry of rain water into the assembly leading to insulation breakdown.

2. The eave is turnable upward in a range of 180° thereby facilitating the operator to insert plugs into the outlets from 45° inclined angle that is ergonomically the most comfortable direction for work.

Those who are skilled in the art will readily perceive how to modify the invention. Therefore, the appended claims are to be construed to cover all equivalent structures which fall within the true scope and spirit of the invention.

What is claimed is:

1. A portable multi-outlet assembly having a turnable eave, the eave installed on a top side of the multi-outlet assembly with two movable slotted plates each being provided with a stopper in the slotted plates, two spring plates provided at two sides of the eave each having a block at its bottom edge, the eave comprising:

a mounting base having two set buttons installed respectively at both sides of its top end;

two opening tenons formed near a bottom of the base;

a guide slot formed at a rear wall of the base;

a circular hole near a bottom of the rear wall;

a plurality of openings and a seat provided at a lower end portion of the base;

a face plate having two semi-circular lugs protruded upwardly at two sides thereof;

a bayonet-shaped post secured to said multi-outlet assembly and adapted to position the multi-outlet assembly on the ground; and upon placement of the two set buttons in the two slots of the semi-circular slotted plates, and the combination of the face plate with the eave such that the two semi-circular lugs at two sides of the face plate and the two slots of the semi-circular slotted plates are coupled together to form two round holes, thereby enclosing the two set buttons such that the eave is turnable upwardly on the mounting base.

2. The multi-outlet assembly of claim 1, wherein each of the set buttons is provided with two button claws to engage the stopper formed in the slot when each of the set buttons is enclosed in each of the round holes such that the eave is only turnable upwards up to 180° on the mounting base, when the eave reaches its furthest rotative position, and the stopper is engaged by a claw formed in the other side of the set button and obstructs a continuous turning of the eave.

3. The multi-outlet assembly of claim 1, wherein the guide slot is formed at the rear wall of the mounting base, the guide slot adapted to guide a power supply core connected to the multi-outlet assembly.

4. The multi-outlet assembly of claim 1 wherein the blocks provided at both sides of the bottom edge of the eave are secured in two opening mortises so as to close the eave on to the mounting base.

5. The multi-outlet assembly of claim 1 wherein four openings are formed at the lower end portion of the mounting base to receive the power supply cord and a plug assembly therethrough.

6. The multi-outlet assembly of claim 1, wherein an insert is provided at a proper position near the top portion of the bayonet-shaped post for inserting into the recess formed on the seat, the engagement of the post to the seat is further enhanced by a bolt engaging through both the circular hole and a screw hole provided on the post and screwed onto a nut.

7. The multi-outlet assembly of claim 1, wherein the outlets are installed on the face plate and are protected with a protecting cover.

8. The multi-outlet assembly of claim 1, wherein a source switch is installed on the face plate and enclosed with an insulation cover thereon to prevent inadvertent contact with live ports.

9. The multi-outlet assembly of claim 1, wherein a saddle is provided at the rear surface of the face plate for fastening the supply cord.

10. The multi-outlet assembly of claim 1, wherein a graduation is provided at a proper position on the post for identifying depth of the post below the ground surface.

* * * * *